United States Patent
Shyu

(10) Patent No.: US 8,994,881 B2
(45) Date of Patent: Mar. 31, 2015

(54) METHOD AND APPARATUS FOR SIMULTANEOUSLY VIEWING MULTIMEDIA CONTENT AND ACCEPTING AN INCOMING VIDEO CALL COMMUNICATION

(71) Applicant: AmTRAN Technology Co., Ltd., Taipei (TW)

(72) Inventor: Fang-Yuan Shyu, Taipei (TW)

(73) Assignee: AmTRAN Technology Co., Ltd., Taipei (TW)

(*) Notice: Subject to any disclaimer, the term of this patent is extended or adjusted under 35 U.S.C. 154(b) by 0 days.

(21) Appl. No.: 14/021,757

(22) Filed: Sep. 9, 2013

(65) Prior Publication Data

US 2014/0009558 A1   Jan. 9, 2014

Related U.S. Application Data

(60) Continuation of application No. 13/193,560, filed on Jul. 28, 2011, now abandoned, which is a division of application No. 11/468,647, filed on Aug. 30, 2006, now Pat. No. 8,013,938, application No. 14/021,757, (Continued)

(30) Foreign Application Priority Data

May 5, 2006   (TW) ............................. 95116128 A

(51) Int. Cl.
    *H04N 5/45*   (2011.01)
    *H04N 7/14*   (2006.01)
    (Continued)

(52) U.S. Cl.
    CPC ............... *H04N 7/14* (2013.01); *H04N 7/147* (2013.01); *H04N 7/173* (2013.01); *H04N 21/4223* (2013.01); *H04N 21/4316* (2013.01); *H04N 21/4788* (2013.01); *H04N 7/15* (2013.01)
    USPC ........ 348/565; 348/14.04; 348/553; 725/152; 715/758

(58) Field of Classification Search
    USPC ............. 348/552, 553, 564, 565, 569, 14.01, 348/14.11, 14.12, 14.05, 14.04, 14.08, 730; 725/24, 131, 139–141, 151–153; 715/751, 753, 758; 379/90.01
    See application file for complete search history.

(56) References Cited

U.S. PATENT DOCUMENTS

| | | |
|---|---|---|
| 3,999,006 A | 12/1976 | Takeuchi et al. |
| 4,349,701 A | 9/1982 | Snopko |

(Continued)

FOREIGN PATENT DOCUMENTS

| | | |
|---|---|---|
| CN | 1315113 A | 9/2001 |
| CN | 1484423 A | 3/2004 |

(Continued)

OTHER PUBLICATIONS

Office Action for Chinese Application No. 2006100987803 received Jun. 5, 2009.

(Continued)

*Primary Examiner* — Victor Kostak
(74) *Attorney, Agent, or Firm* — Alston & Bird LLP

(57) ABSTRACT

An example method and apparatus for audio-visual communication is provided. In some examples, a method as disclosed herein may include receiving an incoming call indication comprising a conversation request from a remote party, wherein the outgoing call request is displayed in a visual communication screen area on a display; establishing a communication link with the remote party in an instance in which an answering signal has been received, the communication link enabling a multi-directional audio and visual conversation; and causing a received video of the remote party to be displayed in the visual communication screen area, wherein the display is operable to display multimedia content in a multimedia screen area simultaneously with the received video of the remote party in the visual communication screen area.

18 Claims, 7 Drawing Sheets

Related U.S. Application Data which is a continuation of application No. 13/193,567, filed on Jul. 28, 2011, now abandoned, which is a division of application No. 11/468,647, filed on Aug. 30, 2006, now Pat. No. 8,013,938.

(51) Int. Cl.

| | |
|---|---|
| *H04N 5/44* | (2011.01) |
| *H04N 5/63* | (2006.01) |
| *H04N 7/16* | (2011.01) |
| *H04N 7/173* | (2011.01) |
| *H04N 21/4223* | (2011.01) |
| *H04N 21/431* | (2011.01) |
| *H04N 21/4788* | (2011.01) |
| *H04N 7/15* | (2006.01) |

(56) References Cited

U.S. PATENT DOCUMENTS

| | | | |
|---|---|---|---|
| 4,356,509 A | 10/1982 | Skerlos et al. | |
| 4,456,925 A | 6/1984 | Skerlos et al. | |
| 5,032,820 A | 7/1991 | Tanikawa et al. | |
| 5,404,393 A | 4/1995 | Remillard | |
| 5,699,107 A | 12/1997 | Lawler et al. | |
| 5,790,173 A | 8/1998 | Strauss et al. | |
| 5,818,441 A * | 10/1998 | Throckmorton et al. | 715/717 |
| 5,877,821 A | 3/1999 | Newlin et al. | |
| 5,936,679 A | 8/1999 | Kasahara et al. | |
| 5,940,489 A | 8/1999 | Cohn et al. | |
| 5,999,207 A | 12/1999 | Rodriguez et al. | |
| 5,999,602 A | 12/1999 | Yang et al. | |
| 6,081,830 A | 6/2000 | Schindler | |
| 6,141,058 A | 10/2000 | Lagoni et al. | |
| 6,172,677 B1 * | 1/2001 | Stautner et al. | 715/716 |
| 6,243,448 B1 | 6/2001 | Corbett et al. | |
| 6,493,020 B1 | 12/2002 | Stevenson | |
| 6,519,771 B1 | 2/2003 | Zenith | |
| 6,587,829 B1 * | 7/2003 | Camarda et al. | 705/3 |
| 6,707,893 B1 | 3/2004 | Basore et al. | |
| 6,747,567 B2 | 6/2004 | Amano et al. | |
| 6,882,299 B1 | 4/2005 | Allport | |
| 6,882,709 B1 | 4/2005 | Sherlock et al. | |
| 6,981,275 B1 | 12/2005 | Maeda et al. | |
| 6,983,305 B2 | 1/2006 | Danker et al. | |
| 7,036,083 B1 | 4/2006 | Zenith | |
| 7,142,230 B2 | 11/2006 | Novak et al. | |
| 7,143,428 B1 | 11/2006 | Bruck et al. | |
| 7,376,907 B2 * | 5/2008 | Santoro et al. | 715/765 |
| 7,379,087 B2 | 5/2008 | Yamatari et al. | |
| 7,395,546 B1 | 7/2008 | Asmussen | |
| 7,466,810 B1 | 12/2008 | Quon et al. | |
| 7,600,137 B2 | 10/2009 | Trappeniers et al. | |
| 7,603,683 B2 | 10/2009 | Reto | |
| 7,623,635 B2 | 11/2009 | Cool | |
| 7,669,213 B1 | 2/2010 | Wick et al. | |
| 7,690,017 B2 | 3/2010 | Stecyk et al. | |
| 7,899,862 B2 | 3/2011 | Appelman et al. | |
| 7,962,948 B1 | 6/2011 | Girouard et al. | |
| 2001/0038690 A1 | 11/2001 | Palmer et al. | |
| 2001/0042095 A1 | 11/2001 | Kim et al. | |
| 2001/0045889 A1 | 11/2001 | Hooberman | |
| 2001/0054071 A1 | 12/2001 | Loeb | |
| 2002/0061095 A1 | 5/2002 | Beecroft | |
| 2002/0069067 A1 * | 6/2002 | Klinefelter et al. | 704/270.1 |
| 2002/0144273 A1 | 10/2002 | Reto | |
| 2003/0040334 A1 | 2/2003 | Lee | |
| 2003/0041332 A1 | 2/2003 | Allen et al. | |
| 2003/0070177 A1 | 4/2003 | Kondo et al. | |
| 2003/0101450 A1 | 5/2003 | Davidsson et al. | |
| 2003/0133551 A1 | 7/2003 | Kahn | |
| 2004/0057568 A1 | 3/2004 | Kawabata et al. | |
| 2004/0203835 A1 | 10/2004 | Trottier | |
| 2005/0131555 A1 | 6/2005 | Trappeniers et al. | |
| 2005/0262542 A1 | 11/2005 | DeWeese et al. | |
| 2006/0088149 A1 | 4/2006 | Sung | |
| 2006/0112344 A1 | 5/2006 | Ducheneaut et al. | |
| 2006/0174207 A1 | 8/2006 | Deshpande | |
| 2006/0259942 A1 | 11/2006 | Toyama et al. | |
| 2007/0016689 A1 | 1/2007 | Birch | |
| 2008/0019491 A1 | 1/2008 | Payne | |
| 2011/0047487 A1 * | 2/2011 | DeWeese et al. | 715/758 |
| 2011/0214144 A1 | 9/2011 | Girouard et al. | |

FOREIGN PATENT DOCUMENTS

| | | |
|---|---|---|
| CN | 1642147 A | 8/2009 |
| JP | 11-017843 A | 1/1999 |
| JP | 2000-295592 A | 10/2000 |
| JP | 2002-281129 A | 9/2002 |
| JP | 2003-125365 A | 4/2003 |
| JP | 2004-080289 A | 3/2004 |
| JP | 2005-039540 A | 2/2005 |
| JP | 2005-086399 A | 3/2005 |
| TW | 428390 B | 4/2001 |

OTHER PUBLICATIONS

Office Action for Chinese Application No. 2006100987803 received Oct. 16, 2009.
Office Action for European Application No. 06119559 dated Jan. 18, 2007.
Office Action for European Application No. 06119559 dated Mar. 27, 2009.
Office Action for Japanese Application No. 2006-255926 dated Jun. 12, 2009.
Office Action for Japanese Application No. 2006-255926 dated Nov. 26, 2009.
Office Action for Taiwanese Application No. 09820601410 dated Sep. 28, 2009.
Office Action for U.S. Appl. No. 13/193,567 dated Oct. 10, 2013.
Office Action for U.S. Appl. No. 14/021,771 dated Oct. 28, 2013.
Office Action for U.S. Appl. No. 14/021,737 dated Nov. 7, 2013.
Office Action for U.S. Appl. No. 14/021,701 dated Nov. 8, 2013.
Office Action for U.S. Appl. No. 13/193,567; dated Jan. 22, 2014.
Office Action for U.S. Appl. No. 14/021,701; dated Feb. 26, 2014.
Office Action for U.S. Appl. No. 14/021,737; dated Mar. 3, 2014.
Office Action for U.S. Appl. No. 14/021,757 dated Feb. 10, 2014.
Office Action for U.S. Appl. No. 14/021,771; dated Feb. 11, 2014.
Examiner's Answer for U.S. Appl. No. 14/021,771; dated Nov. 3, 2014.

* cited by examiner

METHOD AND APPARATUS FOR SIMULTANEOUSLY VIEWING MULTIMEDIA CONTENT AND ACCEPTING AN INCOMING VIDEO CALL COMMUNICATION

CROSS-REFERENCE TO RELATED APPLICATIONS

This non-provisional application is a continuation of U.S. application Ser. No. 13/193,560 filed Jul. 28, 2011, which is a divisional of Ser. No. 11/468,647 filed Aug. 30, 2006, now U.S. Pat. No. 8,013,938, which claims priority under 35 U.S.C. §119(a) on Patent Application No(s). 095116128 filed in Taiwan, R.O.C. on May 5, 2006, the entire contents of the foregoing are hereby incorporated by reference.

This non-provisional application is also a continuation of U.S. application Ser. No. 13/193,567 filed Jul. 28, 2011, which is a divisional of Ser. No. 11/468,647 filed Aug. 30, 2006, now U.S. Pat. No. 8,013,938, which claims priority under 35 U.S.C. §119(a) on Patent Application No(s). 095116128 filed in Taiwan, R.O.C. on May 5, 2006, the entire contents of the foregoing are hereby incorporated by reference.

BACKGROUND OF THE INVENTION

1. Field of Invention

The present invention relates to a television, and more particularly, to a television integrated with a network.

2. Related Art

The number of users of audio-visual communication services over a network is growing rapidly with the maturity of the broadband network environment, due to the high quality of the audio-visual communication of the Voice over Internet Protocol (VoIP) and the network visual specifications (H.323), and the development of specifically designed communication software for these applications.

However, currently, many video content and services are conducted over Internet, thus, the user has to use personal computers (PCs) or specialized network phones and specialized network video phones to enjoy the convenience of these services. Though many users spend more time on computers than on televisions, and they soon get used to take the computer as a tool for instant visual or voice communication, as for users who are not accustomed to or unfamiliar with computer operations, these services cannot be prevailing.

The recent phone surveys conducted by two American market research companies: Points North Group and Horowitz Associates shows, 25% of the Internet users prefer to watch downloaded TV programs and movies on the computer, while 38% of the users prefer to enjoy this kind of videos on televisions. As for users with the age of 18-34, 68% of them are more interested in televisions, while 45% of them prefer to enjoy videos on computers. These data show that, though the computer has multiple functions and better interactivity, most users still prefer to use televisions, for example, to watch TV programs or films, to ease their busy activities on computers and to relax themselves.

As can known from the above that, the television is a non-resistible medium for most consumers, and its popularity and convenience are far beyond the computer. Therefore, if the network visual or voice communication service can become available through simple operations on the televisions, the popularity of such service will be enhanced, thereby providing better opportunity to both networks and televisions.

SUMMARY OF THE INVENTION

To solve the aforementioned problems, the present invention discloses a method of audio-visual communication using a television and the television using the same, which aims at enabling users to enjoy the network visual and voice communication service with a television, wherein the techniques of wired broadband or wireless broadband network and the digital television are integrated together. Thus, the television is not only capable of receiving broadcasted signals passively, but also capable of achieving bi-directional communication among users, and receiving the latest TV information while conducting communications synchronically.

According to specific embodiments of the present invention, as for the network communication using the television, when the television is in standby or playing state, there are different processing procedures directed to incoming and outgoing calls.

When the television is in the standby state, it receives the incoming call signals from a remote user, and conducts different operations according to the auto wakeup setting set by the user, i.e., the television is automatically turned on or not turned on. Then, the incoming-call information is displayed on the image of the television, and/or the incoming-call reminding sound is played with a remote controller or a built-in speaker of the television. At this time, the user can use the remote controller of the television or the television to select whether to answer the phone to enter the conversation state or not answer the phone to terminate the calling respectively.

When the television is in the playing state, the television receives the incoming-call signal from the remote user, and displays the incoming-call information on the image, and/or plays the incoming-call reminding sound with the remote controller or the built-in speaker of the television. At this time, similarly, the user can further use the remote controller of the television or the television to select whether to answer the phone to enter the conversation state or not answer the phone to terminate the program respectively.

When the user wants to make an outgoing call, he/she uses the remote controller of the television or the television to display the dial menu on the TV image, and then selects the remote user to be contacted with from the contact list of the dial menu, or inputs the number of the outgoing call via the remote controller to complete the dialing operation. Then, the user waits for a response from the remote user.

The present invention further comprises a program of establishing the contact list. The user uses the remote controller of the television or the television to display the contact list on the TV image, and utilizes the functions of establishing and searching contacts on the contact list to connect to the network server terminal to search the contactor information, and to decide whether to add the contact information into the contact list or not depending upon the successful or failed searching response from the network server.

According to the disclosure of the present invention, the user can utilize the Picture in Picture (PIP) technology to conduct the bi-directional visual conversation with the remote called party while watching television programs. Furthermore, multiple parties can make the visual communication at the same time without being influenced by the TV broadcasting, such as sports or educational programs. Through the method of the present invention, the users can hold discussions or research together, and the telecommunication cost can be saved significantly. On the other aspect, the user for example, can remote monitor his/her house with a personal digital assistant (PDA) or mobile phone via a built-in video camera or the remote controller of the television, thereby ensuring the security of the house.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Detailed features and advantages of the present invention are described below through embodiments, which is sufficient for those skilled in the art to understand the technical content of the present invention and to implement the present invention accordingly.

Through the content of the specification, the claims, and the drawings, those skilled in the art can easily understand the objects and advantages of the present invention.

Figure 1:
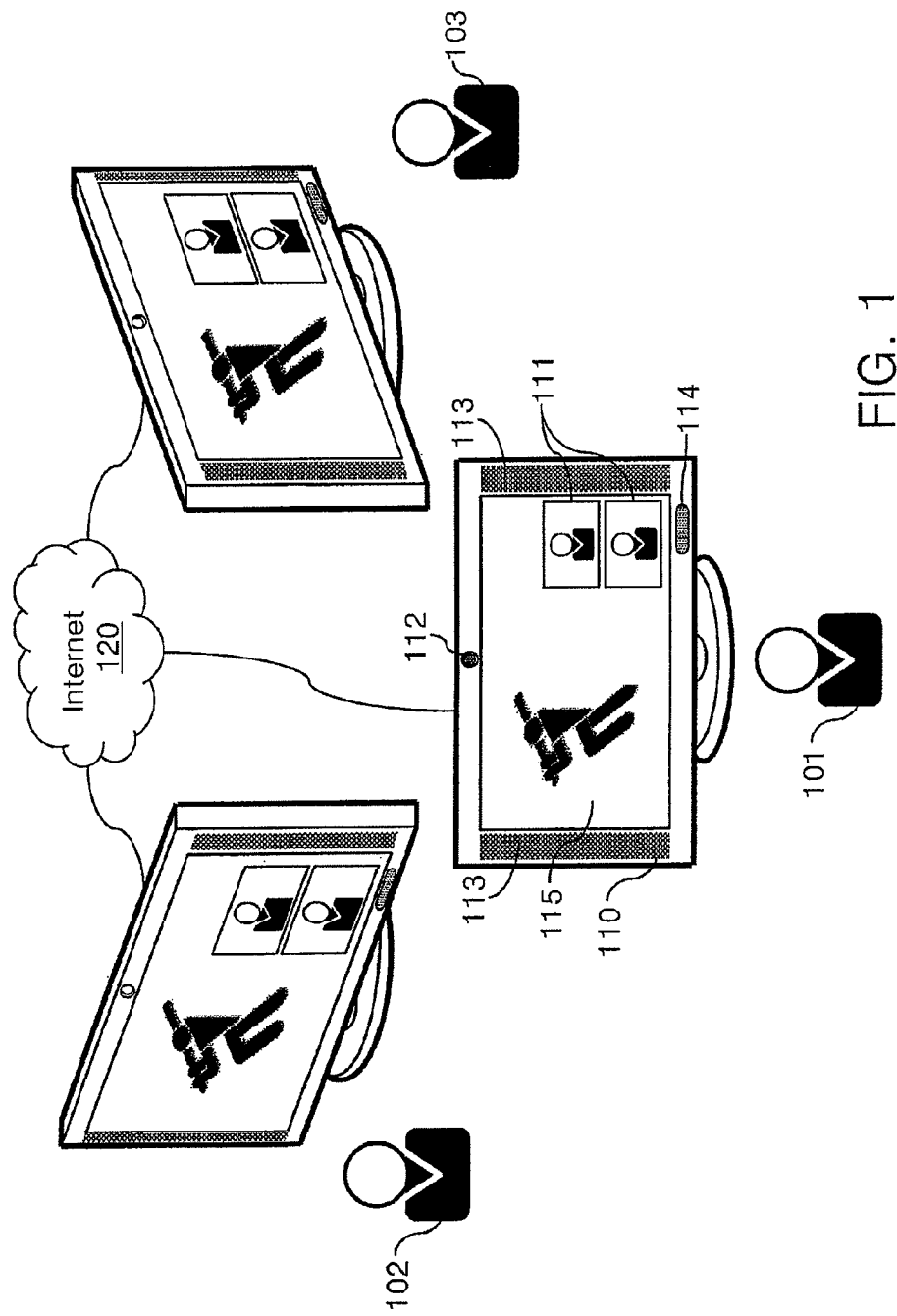
FIG. 1 is a schematic view of a method of audio-visual communication using a television and a television using the same according to the present invention.
Figure 2:
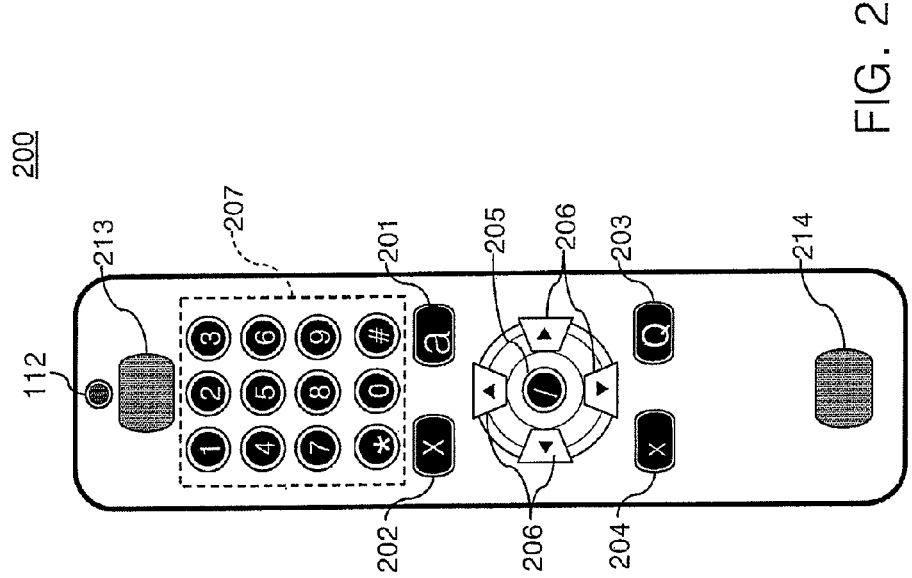
FIG. 2 is a schematic view of a remote controller used together with the method of audio-visual communication using a television and the television using the same according to the present invention.

Referring to FIG. 1, it is a schematic view of a method of audio-visual communication using a television and a television using the same according to the present invention. As shown in FIG. 1, the PIP 111 technology is used in the present invention, thus, the users 101-103 conduct network visual or voice conversation with remote users 101-103 over Internet 120 while watching TV 110. Certainly, the Internet 120 can be a wired or wireless broadband network. According to a specific embodiment of the present invention, the users 101-103 can conduct a one-to-one visual communication or a multi-party visual communication. Referring to FIG. 2, it is a schematic view of a remote controller used together with a television according to the present invention. A video camera 112 used for visual communication is installed in the television 110 or on the remote controller 200 of the television.

Figure 3:
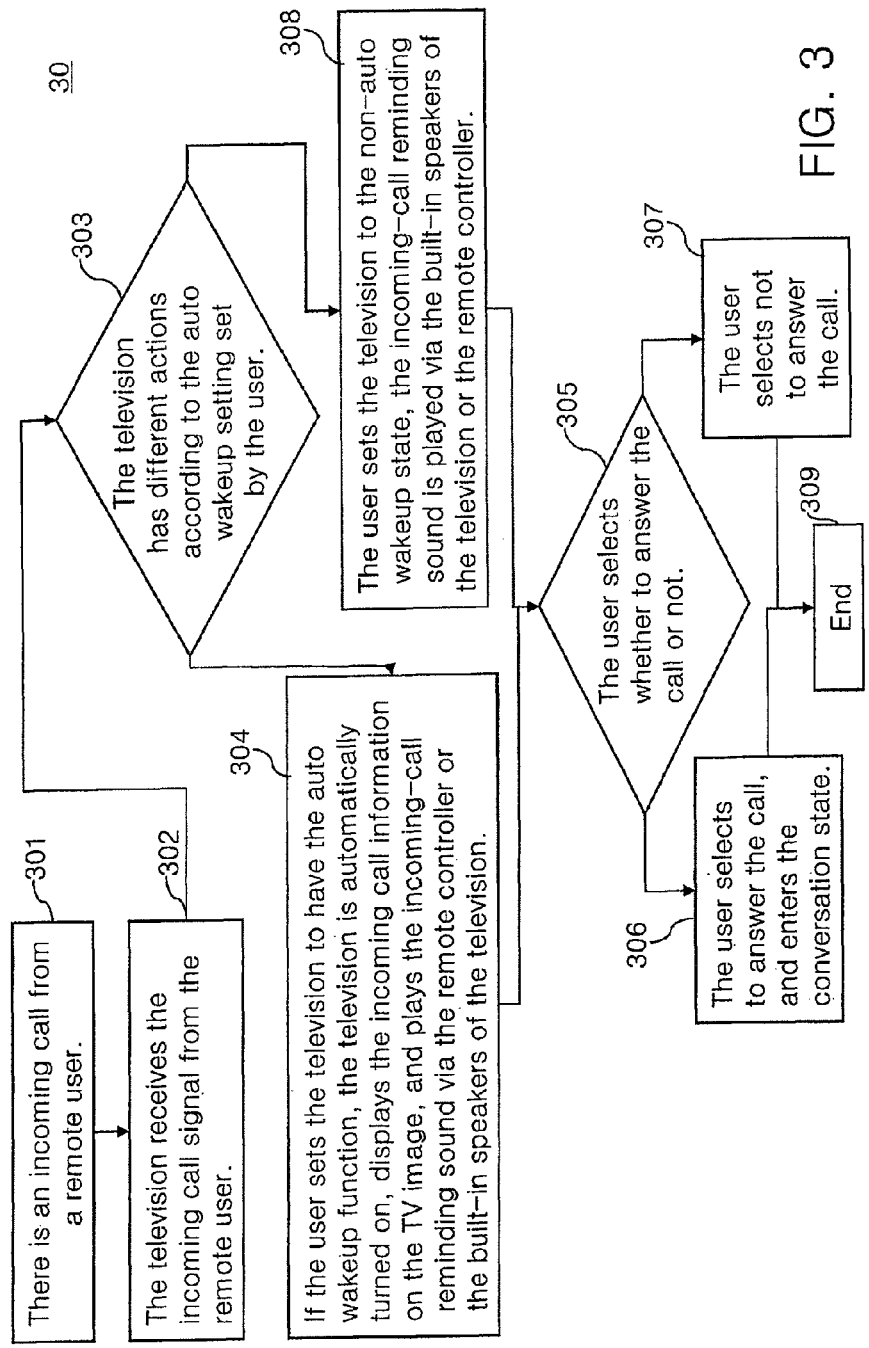
FIG. 3 is a processing flow chart for the television in the standby state according to the present invention, when there is an incoming call.

According to the circumstance that the television 110 is in a standby state or a playing state, there are different procedures for the incoming and outgoing calls in the present invention. Referring to FIG. 3, it is a processing flow chart 30 for the television 110 in the standby state when there is an incoming call. When there is an incoming call from a remote user (Step 301), the television 110 receives the incoming call signal from the remote user (Step 302). Then, the television 110 has different actions according to the auto wakeup setting set by the user (Step 303). If the user sets the television to have the auto wakeup function, the television 110 is automatically turned on and displays TV programs and information of the incoming call on the TV image, and plays the incoming-call reminding sound together with/without the remote controller 200 or the built-in speakers 213, 113 of the television (Step 304). When the incoming-call information or the incoming-call reminding sound has been received, the user selects whether to answer the call or not (Step 305). When the user selects to answer the call, he/she presses the OK/Talk button 201 on the remote controller 200 or the OK/Talk button on the operation panel of the television 110 to answer the call, and uses the built-in microphone 214 and speaker 213 of the remote controller 200 or the built-in microphone 114 and speaker 113 of the television 110 to answer and receive the call, and then, enters the conversation state (Step 306) until the call is over (Step 309). When the user selects not to answer the call, he/she presses the Cancel/End button 202 of the remote controller 200 or the Cancel/End button on the operation panel of the television 110 to select not to answer the call (Step 307), and thereby directly terminating the incoming call procedure (Step 309).

On the other hand, when the user sets the television 110 to the non-auto wakeup state, the television 110 will not display any image, and the incoming-call reminding sound is played via the built-in speakers 213, 113 of the television 110 or the remote controller 200 (Step 308). At this time, the user selects whether to answer the call or not (Step 305). When the user selects to answer the call, he/she presses the OK/Talk button 201 on the remote controller 200 or the OK/Talk button on the operation panel of the television 110 to answer the call, and uses the built-in microphone 214 and speaker 213 of the remote controller 200 or the built-in microphone 114 and speaker 113 of the television 110 to answer and receive the call, and then, enters the conversation state (Step 306) until the call is over (Step 309). When the user selects not to answer the call, he/she presses the Cancel/End button 202 of the remote controller 200 or the Cancel/End button on the operation panel of the television 110 to select not to answer the call (Step 307) and thereby directly terminating the incoming call procedure (Step 309).

According to a specific embodiment of the present invention, in Step 304, when the remote user turns on the visual image, and when the television 110 is turned on, besides the broadcasted TV programs and the information of the incoming call, the visual image of the remote user is also displayed in the TV image. The user can set the TV programs to be displayed in the mother picture 115 (main picture) of the television 110, and set the visual image of the user to be displayed in the son picture 111 of the television 110. Alternatively, the user can also set the TV programs to be displayed in the son picture 111 of the television 110, and set the visual image of the user to be displayed in the son picture 115 (main picture) of the television 110. The incoming-call information can be displayed in one of the mother and son images, which can be the ID/account of the remote user or the phone number of the incoming call. When the user answers the incoming call, the incoming call information is changed into information about the conversation state, for example, the information of "In Conversation" is displayed.

Figure 4:
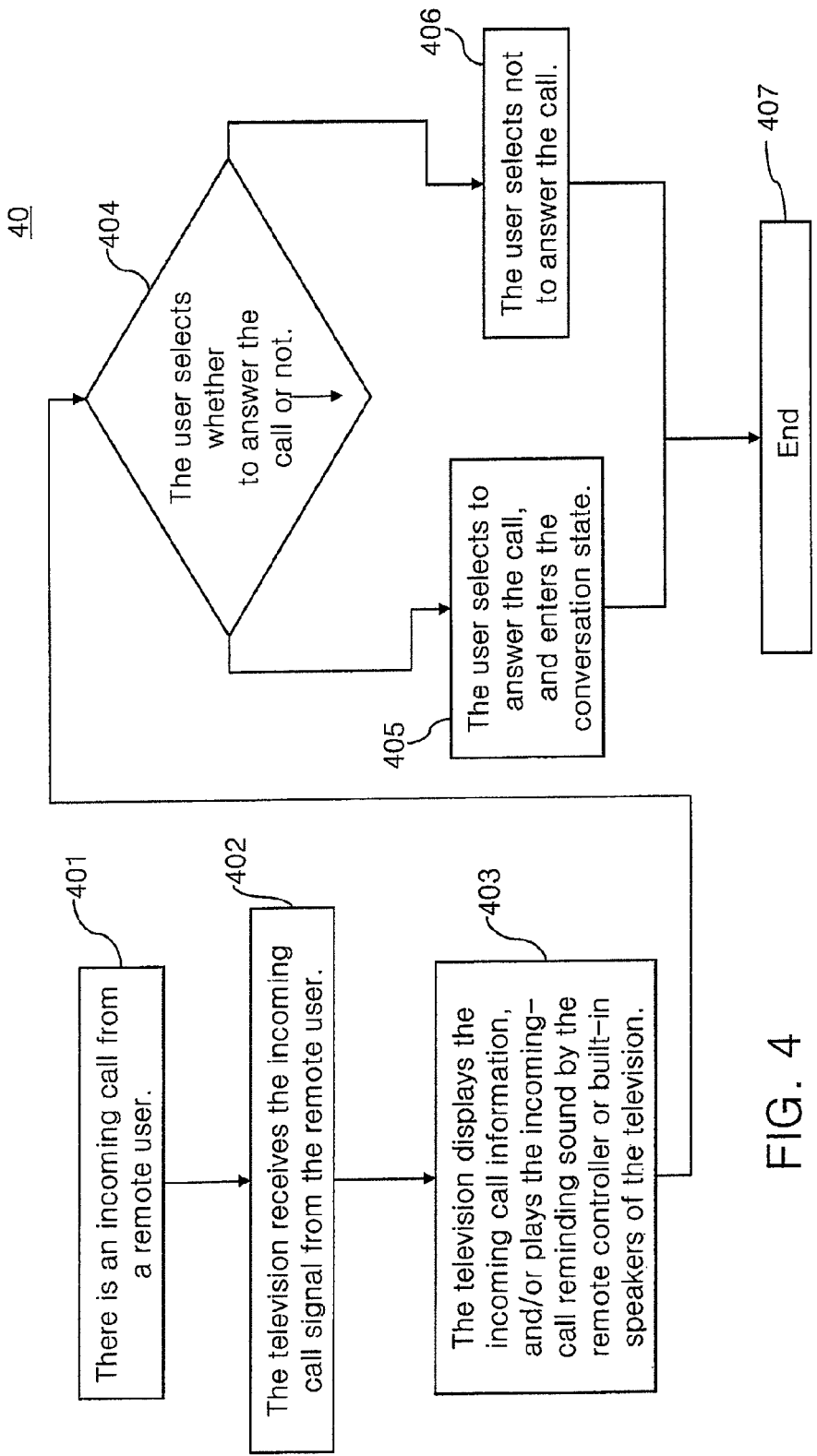
FIG. 4 is a processing flow chart of the television in the playing state according to the present invention, when there is an incoming call.

Referring to FIG. 4, it is a processing flow chart 40 of the television 110 in the playing state when there is an incoming call. The processing procedure comprises: when there is an incoming call from the remote user (Step 401), the television 110 receives signals of the remote user (Step 402) and at this time, displays the broadcasted TV programs and the incoming call information on the TV image, and/or plays the incoming-call reminding sound by the built-in speakers 113, 213 of the television or the remote controller 200 of the television (Step 403). After the user has received the incoming call information, the user selects whether to answer the call or not (Step 404). When the user selects to answer the call, he/she presses the OK/Talk button 201 on the remote controller 200 or the OK/Talk button on the operation panel of the television 110 to answer the call, and uses the built-in microphone 214 and speaker 213 of the remote controller 200 or the built-in microphone 114 and speaker 113 of the television 110 to answer and receive the call, and then, enters the conversation state (Step 405) until the call is over (Step 407). When the user selects not to answer the call, he/she presses the Cancel/End button 202 of the remote controller 200 or the Cancel/End button on the operation panel of the television 110 to select not to answer the call (Step 406) and thereby directly terminating the incoming call procedure (Step 407).

According to a specific embodiment of the present invention, in Step 403, when the 30 remote user turns on the visual image, besides the broadcasted TV programs and the incoming-call information, the visual image of the remote user is also displayed on the TV image. The user can set the TV programs to be displayed in the mother picture 115 (main picture) of the television 110, and set the visual image of the user to be displayed in the son picture 111 of the television 110. Alternatively, the user can also set the TV programs to be displayed in the son picture 111 of the television 110, and set the visual image of the user to be displayed in the mother picture 115 (main picture) of the television 110. The incoming-call information is displayed in one of the mother and son images, which can be the ID/account of the remote user or the phone number of the incoming call. When the user answers the incoming call, the incoming-call information is changed into information about the conversation state, for example, the information of "In Conversation" is displayed.

Figure 5:
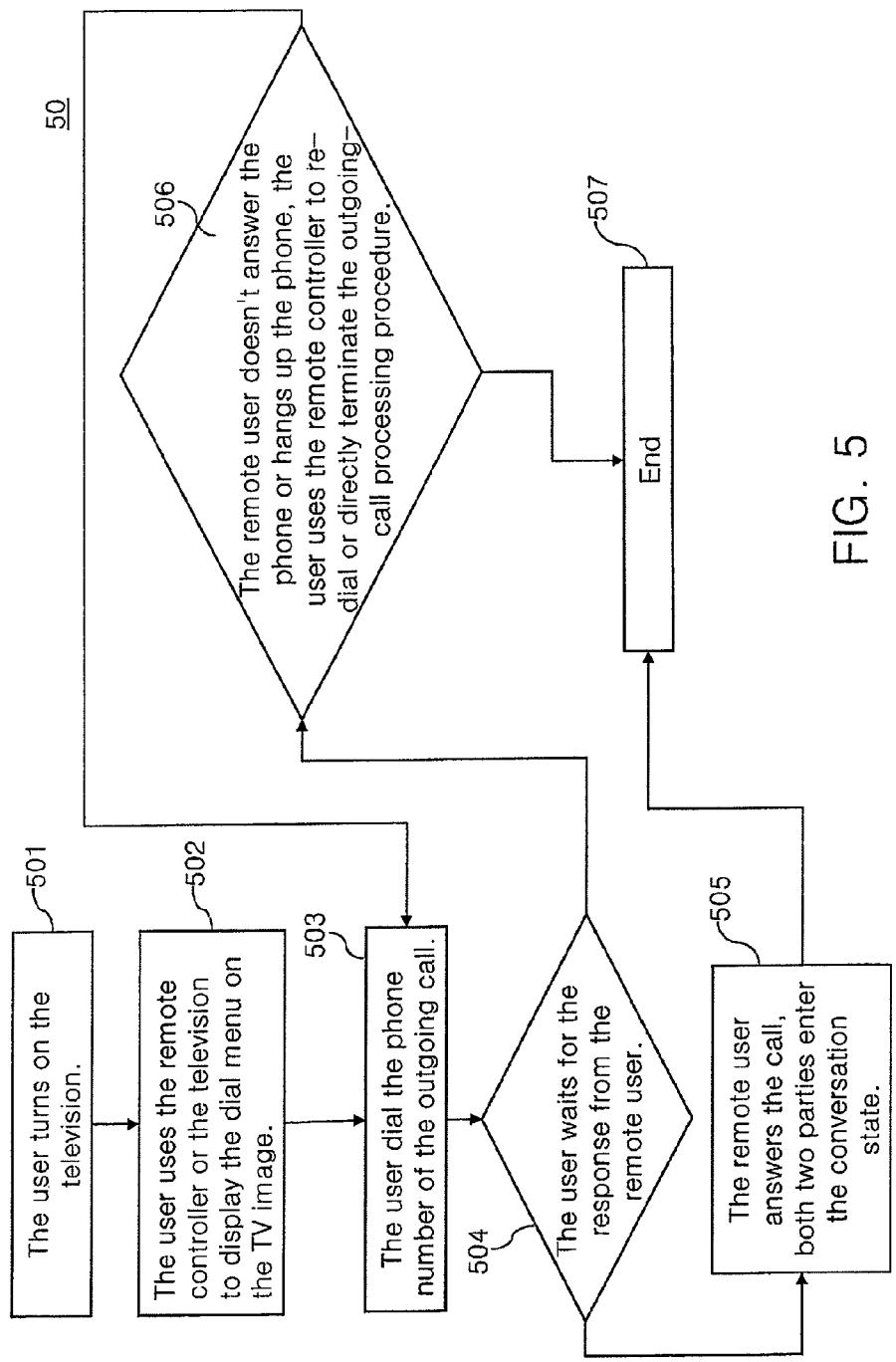
FIG. 5 is a processing flow chart of an outgoing call according to the present invention.

Referring to FIG. 5, it is a processing flow chart 50 of an outgoing call. When the user turns on the television 110 (Step 501), he/she uses the dial button 205 of the remote controller 200 or the dial button on the operation panel of the television 110 to display the dial menu on the TV image (Step 502). The dial menu comprises the contact list. The user uses the select button on the operation panel of the television 110 or the select button 206 of the remote controller 200 to select the remote user to be contacted with from the contact list, or uses the number buttons 207 of the remote controller 200 to input and dial the phone number of the outgoing call (Step 503). When the user presses the OK/Talk button 201 of the remote controller 200 or the OK/Talk button on the operation panel of the television 110 to select to confirm the dialing operation, the dialing operation is completed, and at this time, the user waits for the response from the remote user (Step 504). If the remote user answers the call, both two parties enter the conversation state (Step 505) until the call is over (Step 507). If the remote user doesn't answer the phone or hangs up the phone (Step 506), the user uses the re-dial button 203 of the remote controller 200 to re-dial or directly terminate the outgoing-call procedure (Step 507). According to a specific embodiment of the present invention, in Step 504, when the user completes the dialing operation, the information about the current dialing state is displayed on the images of the television 110, for example, the information of "Dialing" is displayed.

Figure 6:
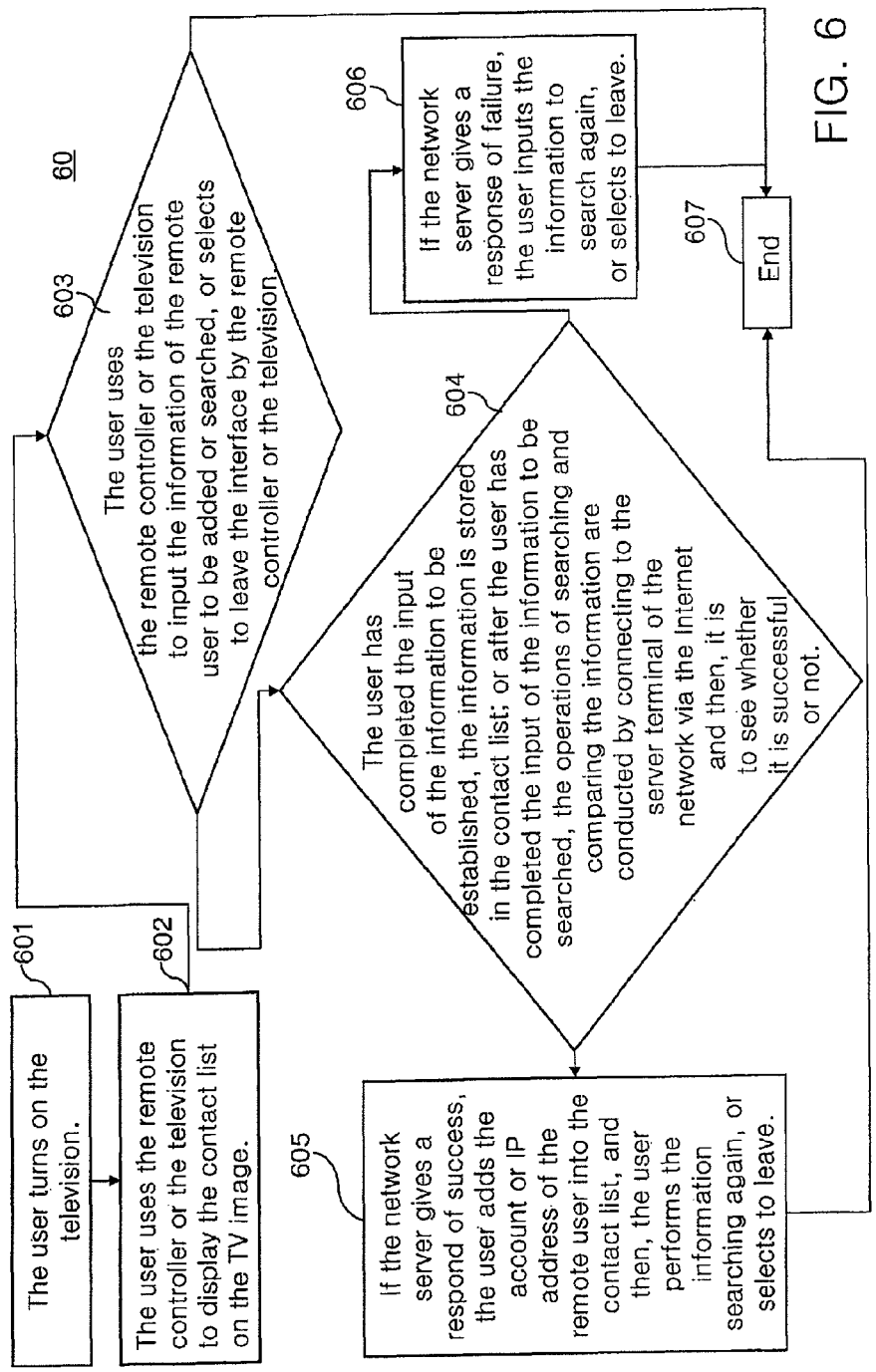
FIG. 6 is a flow chart for establishing the contact list according to the present invention.

As described above, the contact list in the processing flow chart of an outgoing call 50 30 can be established by way of searching. For example, a remote user is added into the contact list by means of searching an account or an IP address. Referring to FIG. 6, it is a flow chart 60 for establishing the contact list. Firstly, the user turns on the television 110 (Step 601). The user uses the dial button 205 of the remote controller 200 or the dial button on the operation panel of the television 110 to display the contact list on the TV image 5 (Step 602). The contact list has the functions of establishing and searching information. The user uses the select button on the operation panel of the television 110 or the select button 206 of the remote controller 200 to input the information of the account or IP address of the remote user to be added or searched. At this time, if the user wants to cancel the establishing or searching function, he/she selects to leave the interface by pressing the skip button 204 of the remote controller 200 or the skip button on the operation panel of the television 110 (Step 603, Step 607). After the user has completed the input of the information to be established, the information is stored in the contact list; or after the user has completed the input of the information to be searched, the operations of searching and comparing the information can be conducted by connecting to the server terminal of the network via the Internet (Step 604). If the network server gives a respond of success, the user adds the account or IP address of the remote user into the contact list, and then, the user can perform the information searching again, or select to leave (Step 605). If the network server gives a response of failure, the user can input the information to search again, or select to leave (Step 606, Step 607).

Figure 7:
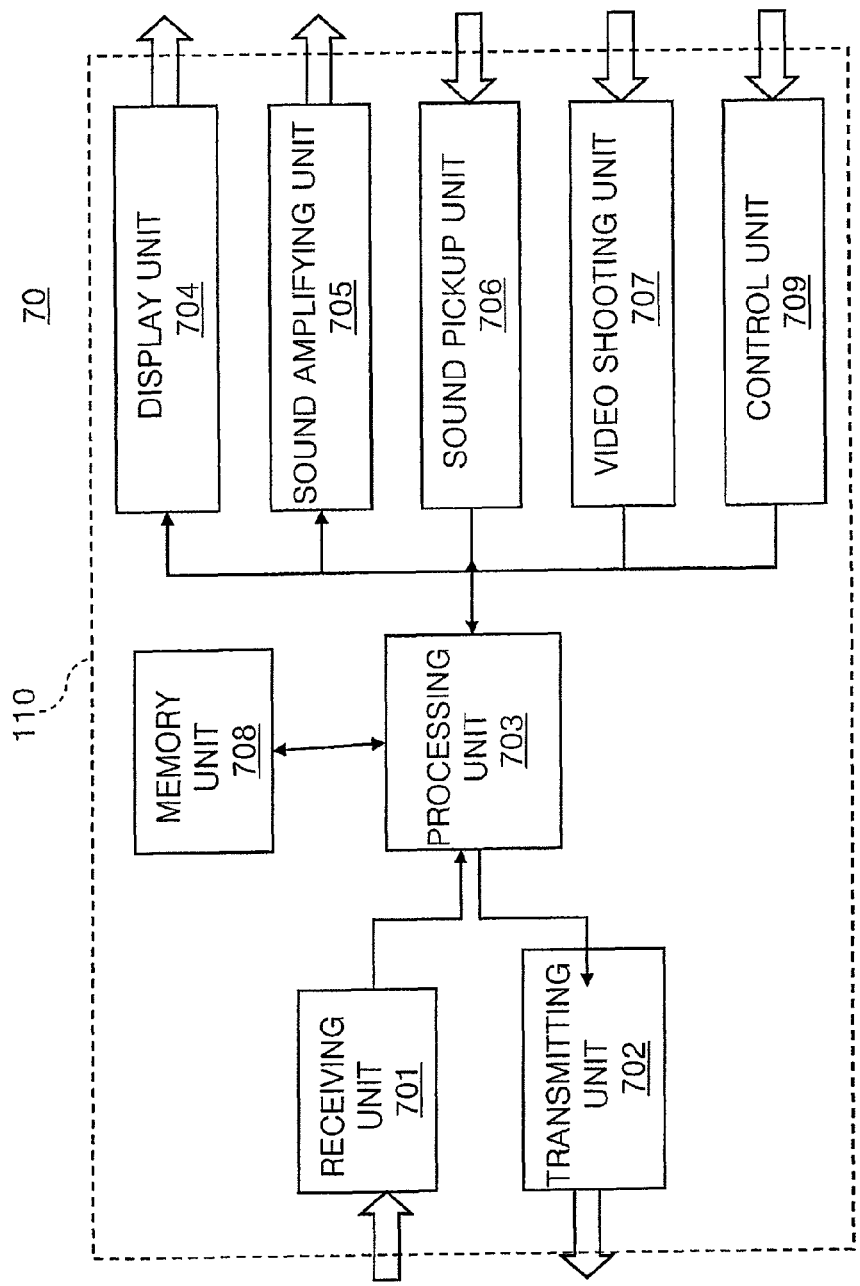
FIG. 7 is a block diagram of functions for the television of the present invention.

Referring to FIG. 7, it is a block diagram 70 of functions for the television of the present invention. As shown in FIG. 7, the television 110 comprises a receiving unit 701, a transmitting unit 702, a processing unit 703, a display unit 704, a sound amplifying unit 705, a sound pickup unit 706, a video shooting unit 707, a memory unit 708, and a control unit 709. The aforementioned components are used to achieve the procedures of incoming and outgoing calls of the present invention. The receiving unit 701 is used to receive the incoming call signal or TV signal from remote users 101-103, and is connected to the processing unit 703, so as to pass the incoming call signal to the processing unit 703 for being processed. The processing unit 703 decides whether to turn on the image of the television or not according to the auto wakeup settings set by the user, and compares the account or phone number of the remote user who sent out the incoming call signal with the information in the memory unit 708. If the image of the television 110 is turned on, the processing unit 703 transmits the compared account or phone number of the remote user to the display unit 704, so as to display the information of the incoming call. Meanwhile, the processing unit 703 plays the incoming-call reminding sound via the sound amplifying unit 705, and/or transmits a control command to the remote controller 200 via the transmitting unit 702, such that the sound amplifying unit (e.g., speaker 113) of the remote controller 200 also plays the incoming-call reminding sound, thereby reminding the user of an incoming call, wherein the sound amplifying unit 705 may be, for example, the speaker 213. If the image of the television 110 is not turned on, the processing unit 703 only plays the incoming-call reminding sound via the sound amplifying unit 705 and/or the speaker 113 of the remote controller 200.

The user can use the control unit 709, such as the OK/Talk button on the operation panel of the television 110, or use the OK/Talk button 201 on the remote controller 200 to select to answer the call, or uses the control unit 709, such as the Cancel/End button on the operation panel of the television 110, or use the Cancel/End button 202 on the remote controller 200 to select not to answer the call. After the call has been answered, the user uses the sound pickup unit 706, such as the built-in microphone 114 of the television 110, or use the built-in microphone 214 of the remote controller 200 to make a conversation, and uses the video shooting unit 707, such as the built-in video camera 112 of the television 110 or the built-in video camera 112 of the remote controller 200 to capture images to achieve the visual communication. Then, the sound pickup unit 706 and the video shooting unit 707 respectively transmit the received sound signals and image signals to the processing unit 703, or the built-in microphone 214 and the video camera 112 of the remote controller 200 respectively transmit the received sound signals and image signals to the processing unit 703. Thus, the processing unit 703 performs the digital signal processing of the sound signals and image signals, including encoding/compressing/modulating signals, and then transmits the processed signals to the remote user via the transmitting unit 702.

When an outgoing call of the user is processed, and the user presses the control unit 709, such as the OK/Talk button on the operation panel of the television 110, or the dial 30 button 205 of the remote controller 200, the control unit 709 transmits the control command to the processing unit 703, or the remote controller 200 transmits the control command to the receiving unit 701, and then, the receiving unit 701 transmits the control command to the processing unit 703. The processing unit 703 receives the control command, and commands the display unit 704 to display the dial menu. The user inputs the dialing number/account number via the control unit 709, such as the select buttons on the operation panel of the television 110, and transmits the number to the processing unit 703, or inputs the dialing number/account number via the select buttons 206 or number buttons 207 of the remote controller 200, and transmits the number to the receiving unit 701, and then, the receiving unit 701 transmits the dialing number/account number to the processing unit 703. When the user has completed the input, he/she inputs the dial command via the control unit 709, such as the OK/Talk button on the operation panel of the television 110, and transmits the dial command to the processing unit 703, or inputs the dial command with the OK/Talk button 206 of the remote controller 200, and transmits the dial command to the receiving unit 701, and then, the receiving unit 701 transmits the dial command to the processing unit 703. After the processing unit 703 has received the dial command, the dialing action is conducted, and the information of the above remote user is sent to the Internet 120 via the transmitting unit 702. As described above, the Internet 120 can be a wired or wireless broadband network.

When the user wants to establish the contact list, he/she presses the control unit 709, such as the OK/Talk button on the operation panel of the television 110, or the dial button 205 of the remote controller 200. At this time, the control unit 709 transmits the control command to the processing unit 703, or the remote controller 200 transmits the control command to the receiving unit 701, and then, the receiving unit 701 transmits the control command to the processing unit 703. After the processing unit 703 has received the control command, it commands the display unit 704 to display the dial menu. The dial menu contains the contact list. The user inputs a first searching command via the control unit 709, such as the select buttons on the operation panel of the television 110, and transmits the first searching command to the processing unit 703, or inputs the first searching command via the select buttons 206 on the remote controller 200, and transmits the first searching command to the receiving unit 701, and then, the receiving unit 701 transmits the first searching command to the processing unit 703. After the processing unit 703 has received the first searching command, it commands the display unit 704 to display the accounts to be input or address list. The user inputs the accounts or addresses via the control unit 709, such as select buttons on the control panel of the television 110, and transmits the accounts or addresses to the processing unit 703, or inputs the accounts or addresses via select buttons 206 or number buttons 207 of the remote controller 200, and transmits the accounts or addresses to the receiving unit 701, and then, the receiving unit 701 transmits the accounts or addresses to the processing unit 703. After the user has completed the input operation, he/she inputs a second searching command via the control unit 709, such as the OK/Talk button on the operation panel of the television 110, and transmits the second searching command to the processing unit 703, or inputs the second searching command via the OK/Talk button 206 of the remote controller 200, and transmits the second searching command to the receiving unit 701, and then, the receiving unit 701 transmits the second searching command to the processing unit 703. After the processing unit 703 has received the second searching command, it conducts the searching operation, and transmits the aforementioned accounts or addresses to Internet 120 via the transmitting unit 702.

To sum up, as for the audio-visual communication method disclosed in the present invention, operation flows of both the "incoming call procedure" and the "outgoing call procedure" are similar to that of the normal local phones or mobile phones. As for the publics who are not accustomed to or unfamiliar with computer operations, the present invention provides optimal convenience in operation. Furthermore, through the method and apparatus of the present invention, the user can non-interruptedly receive information broadcasted via televisions together with the audio-visual communication on the basis of a simple architecture. Therefore, the user can acquire more sufficient experiences on communications.

Till now, descriptions about different procedures for incoming and outgoing calls and the procedures for establishing and searching the contact list according to the present invention have been disclosed, and furthermore, the devices for achieving the procedures have also been disclosed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. A method comprising:
receiving an incoming call indication comprising a conversation request from a remote party, wherein, according to one or more auto wakeup settings, the incoming call request is at least one of displayed on a visual communication screen area on a display or sounded using an incoming call reminding sound;
establishing a communication link with the remote party in an instance in which an answering signal has been received, the communication link enabling a multi-directional audio and visual conversation; and
causing, using a processing unit, a received video of the remote party to be displayed in the visual communication screen area, wherein the display is operable to display multimedia content in a multimedia screen area simultaneously with the received video of the remote party in the visual communication screen area.

2. The method of claim 1, further comprising:
causing a video shooting unit to be activated in response to the answering signal; and
causing video captured by the video shooting unit to be transmitted as a transmit video signal to the remote party.

3. The method of claim 2, further comprising:
causing a sound pickup unit to be activated in response to the answering signal; and
causing sound captured by the sound pickup unit to be transmitted as a transmit sound signal to the remote party, wherein the transmit sound signal is interlaced with the transmit video signal for the conversation.

4. The method of claim 3, further comprising:
receiving a received sound signal and a received video signal over the communications link from the remote party;
processing the received sound signal and the received video signal for display as the received video of the remote party for the conversation; and
providing, using the processing unit, non-interrupted audio and visual communication with the remote party by simultaneously displaying the received video, outputting the received sound signal, and transmitting the interlaced transmit sound signal and transmit video signal to the remote party.

5. The method of claim 1, further comprising:
receiving a received sound signal and a received video signal over the communications link from the remote party; and
processing the received sound signal and the received video signal for display as the received video of the remote party for the conversation.

6. The method of claim 1, wherein the visual communication screen area is displayed instead of the multimedia screen area in an instance in which the answering signal is received.

7. The method of claim 1, wherein an indication of the incoming call request is displayed on the display in the visual communication screen area simultaneously with multimedia content in the multimedia screen area.

8. The method of claim 1, further comprising:
determining that a termination signal has been received; and
causing the visual communication screen area to be removed from the display.

9. An apparatus comprising a processor unit and a memory unit, the processor unit configured to cause the apparatus to:
receive an incoming call indication comprising a conversation request from a remote party, wherein the apparatus is configurable such that the incoming call request, in accordance with one or more auto wakeup settings, is at least one of displayed on a visual communication screen area on a display or sounded using an incoming call reminding sound;
establish a communication link with the remote party in an instance in which an answering signal has been received, the communication link enabling a multi-directional audio and visual conversation; and
cause a received video of the remote party to be displayed in the visual communication screen area, wherein the display is operable to display multimedia content in a multimedia screen area simultaneously with the received video of the remote party in the visual communication screen area.

10. The apparatus of claim 9, wherein the processor unit further causes the apparatus to:
cause a video shooting unit to be activated in response to the answering signal; and
cause video captured by the video shooting unit to be transmitted as a transmit video signal to the remote party.

11. The apparatus of claim 10, wherein the processor unit further causes the apparatus to:
cause a sound pickup unit to be activated in response to the answering signal; and
cause sound captured by the sound pickup unit to be transmitted as a transmit sound signal to the remote party, wherein the transmit sound signal is interlaced with the transmit video signal for the conversation.

12. The apparatus of claim 11, wherein the processor unit further causes the apparatus to:
receive a received sound signal and a received video signal over the communications link from the remote party;
process the received sound signal and the received video signal for display as the received video of the remote party for the conversation; and
provide non-interrupted audio and visual communication with the remote party by simultaneously displaying the received video, outputting the received sound signal, and transmitting the interlaced transmit sound signal and transmit video signal to the remote party.

13. The apparatus of claim 9, wherein the processor unit further causes the apparatus to:
receive a received sound signal and a received video signal over the communications link from the remote party; and
process the received sound signal and the received video signal for display as the received video of the remote party for the conversation.

14. The apparatus of claim 9, wherein the visual communication screen area is displayed instead of the multimedia screen area in an instance in which the answering signal is received.

15. The apparatus of claim 9, wherein an indication of the incoming call request is displayed on the display in a visual communication screen area simultaneously with multimedia content in the multimedia screen area.

16. The apparatus of claim 9, wherein the processor unit further causes the apparatus to:
determine that a termination signal has been received; and
cause the visual communication screen area to be removed from the display.

17. The apparatus of claim 9, wherein the apparatus is a television or a mobile device.

18. The apparatus of claim 17, wherein the auto wakeup settings are configurable to cause the incoming call request to be at least one of displayed on the visual communication screen area on a display or sounded using the incoming call reminding sound in an instance in which the television is off.

* * * * *